(12) United States Patent
Watanabe et al.

(10) Patent No.: US 12,468,808 B2
(45) Date of Patent: Nov. 11, 2025

(54) RISK DEPENDENCY EVALUATION OF A SOURCE CODE FOR TASK AUTOMATION

(71) Applicant: International Business Machines Corporation, Armonk, NY (US)

(72) Inventors: Yuji Watanabe, Chuouku (JP); Ruriko Kudo, Saitama (JP); Hirokuni Kitahara, Sumida-ku (JP)

(73) Assignee: International Business Machines Corporation, Armonk, NY (US)

(*) Notice: Subject to any disclaimer, the term of this patent is extended or adjusted under 35 U.S.C. 154(b) by 208 days.

(21) Appl. No.: 18/346,166

(22) Filed: Jun. 30, 2023

(65) Prior Publication Data

US 2025/0005152 A1 Jan. 2, 2025

(51) Int. Cl.
*G06F 21/56* (2013.01)
*G06F 8/41* (2018.01)
*G06F 8/75* (2018.01)

(52) U.S. Cl.
CPC ............ *G06F 21/563* (2013.01); *G06F 8/433* (2013.01); *G06F 8/75* (2013.01)

(58) Field of Classification Search
CPC ........... G06F 21/563; G06F 8/433; G06F 8/75
See application file for complete search history.

(56) References Cited

U.S. PATENT DOCUMENTS

| | | | |
|---|---|---|---|
| 11,675,584 B1 * | 6/2023 | Sengupta | G06F 8/75 717/124 |
| 12,099,835 B1 * | 9/2024 | Gunnin | G06F 8/436 |
| 2017/0034023 A1 | 2/2017 | Nickolov et al. | |
| 2018/0129494 A1 * | 5/2018 | Odvody | G06F 8/71 |
| 2023/0236564 A1 * | 7/2023 | Shmidt | G06F 21/563 700/18 |
| 2023/0281317 A1 * | 9/2023 | Clement | G06N 3/084 726/25 |

FOREIGN PATENT DOCUMENTS

CN 109960660 A 7/2019

OTHER PUBLICATIONS

Ruriko et al., Integrity Shield, Sep. 19, 2022, 4 pages.

(Continued)

*Primary Examiner* — Clayton R Williams
(74) *Attorney, Agent, or Firm* — Onyx IP Group

(57) ABSTRACT

A risk dependency platform may obtain a source code for task automation. The risk dependency platform may analyze the source code to determine one or more dependencies associated with the source code. The one or more dependencies may identify referenced source code that are included in the source code by reference. The risk dependency platform may obtain the referenced source code and may decompose the source code and the referenced source code into a plurality of tasks. The plurality of tasks may invoke a plurality of modules that are executables. The risk dependency platform may analyze the plurality of tasks to determine operations that are performed based on the plurality of modules being executed. The risk dependency platform may evaluate the operations to identify one or more risks associated with performing the operations. The risk dependency platform may perform an action based on the one or more risks.

20 Claims, 12 Drawing Sheets

(56) References Cited

OTHER PUBLICATIONS

Autremaitre et al., Ansible Security Assessment, Quarkslab's website, May 28, 2020, 19 pages.
Motlib et al., Fix badge linking to rules #2746, Ansible-lint, Nov. 2022, 2 pages.
M. Hassan and A. Rahman, "As Code Testing: Characterizing Test Quality in Open Source Ansible Development," in 2022 IEEE Conference on Software Testing, Verification and Validation (ICST), Valencia, Spain, 2022 pp. 208-219.
Rahman et al., Security Smells in Ansible and Chef Scripts: A Replication Study. 1, 1, ACM Transaction on Software Engineering and Methodology, Jun. 2018, 31 pages.
Anonymous, System and Method for Setting Breakpoints when Debugging Ansible Playbook Tasks, IP.com, Oct. 11, 2021, 5 pages.
Dawez et al., Automate the installation of tfsec on linux #1847, tfsec, Aug. 2022, 9 pages.
Kumara et al., The do's and don'ts of infrastructure code: A systematic gray literature review, Information and Software Technology, vol. 137, 2021, 20 pages.

* cited by examiner

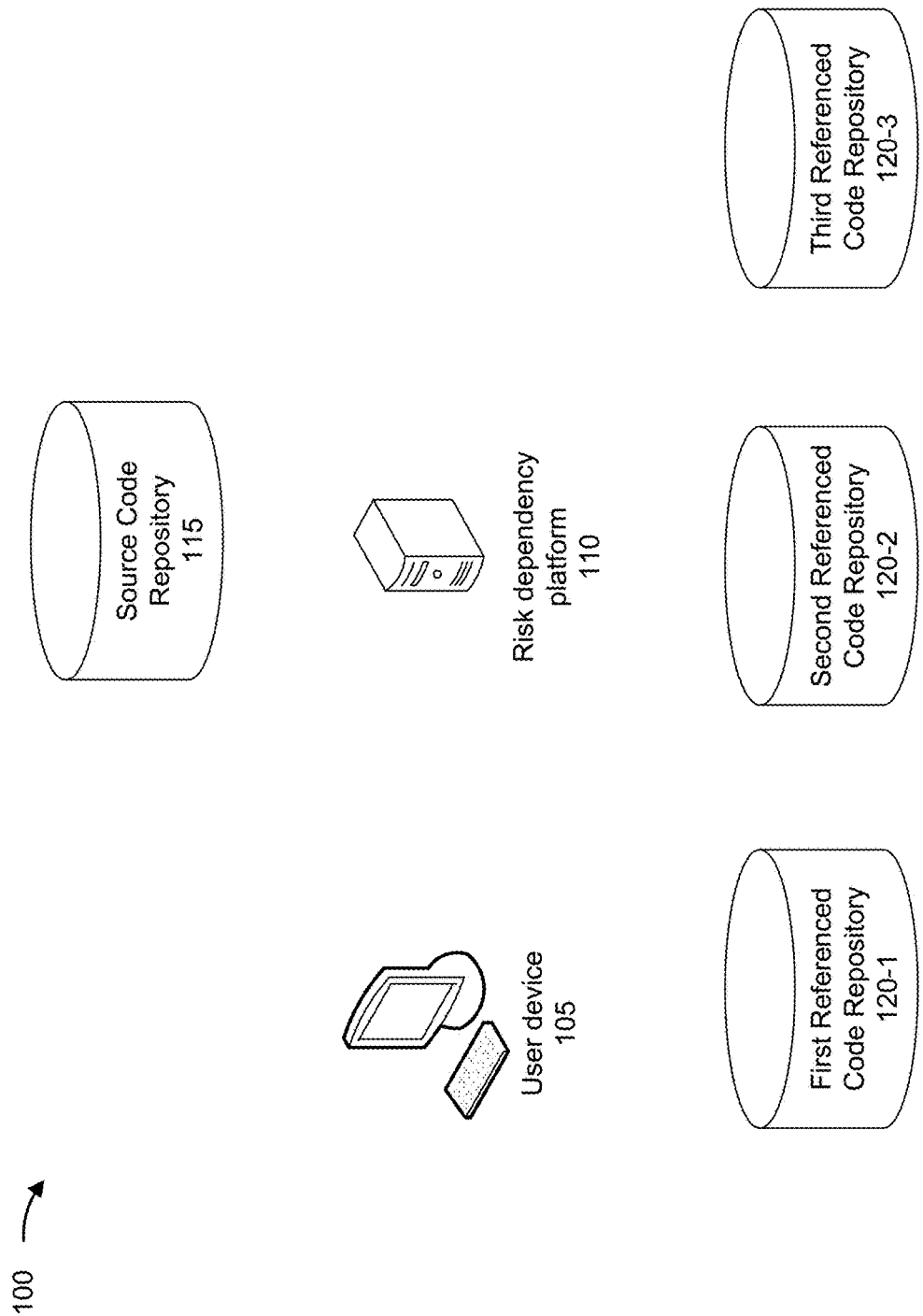

RISK DEPENDENCY EVALUATION OF A SOURCE CODE FOR TASK AUTOMATION

BACKGROUND

The present invention relates to risk evaluation of source code, and more specifically, to risk evaluation of source code that incorporates referenced source code for automating tasks. Task automation enables the use of computing technology to perform tasks instead of a user performing the task. The tasks may be time-consuming and repetitive. Accordingly, task automation may increase productivity of the user by removing such time-consuming and repetitive tasks from the list of responsibilities of the user.

SUMMARY

In some implementations, a computer-implemented method comprising: obtaining a source code for task automation; analyzing the source code to determine one or more dependencies associated with the source code; obtaining the referenced source code; decomposing the source code and the referenced source code into a plurality of tasks; analyzing the plurality of tasks to determine operations that are performed based on the plurality of modules being executed; evaluating the operations to identify one or more risks associated with performing the operations; and performing an action based on the one or more risks identified based on evaluating the operations. The one or more dependencies identify referenced source code that are included in the source code by reference. The plurality of tasks invoke a plurality of modules that are executables.

In some implementations, a computer program product comprising: one or more computer readable storage media, and program instructions collectively stored on the one or more computer readable storage media, the program instructions comprising: program instructions to analyze a source code to determine one or more dependencies associated with the source code; program instructions to obtain the referenced source code; program instructions to decompose the source code and the referenced source code into a graphical representation that identifies a plurality of tasks; program instructions to analyze the plurality of tasks to determine task types for the plurality of modules; program instructions to evaluate the operations, using one or more rules, to identify one or more risks associated with performing the operations; and program instructions to cause the source code to be executed based on the one or more risks. The one or more dependencies identify referenced source code that is included in the source code by reference. The plurality of tasks are portions of the source code and of the referenced source code. The plurality of tasks invoke a plurality of modules that are executables. The task types identify operations that are performed based on the plurality of modules being executed.

In some implementations, a system comprising: one or more devices configured to: analyze a source code to determine one or more dependencies associated with the source code; obtain the referenced source code; decompose the source code and the referenced source code into a graphical representation that identifies a plurality of tasks; analyze the plurality of tasks to determine task types for the plurality of modules; evaluate the operations to identify one or more risks associated with performing the operations; and cause the source code to be executed based on the one or more risks. The one or more dependencies identify referenced source code that is included in the source code by reference. The plurality of tasks are portions of the source code and of the referenced source code. The plurality of tasks invoke a plurality of modules that are executables. The task types identify operations that are performed based on the plurality of modules being executed.

BRIEF DESCRIPTION OF THE DRAWINGS

FIGS. 1A-1I are diagrams of an example implementation described herein.

DETAILED DESCRIPTION

Figure 1B:
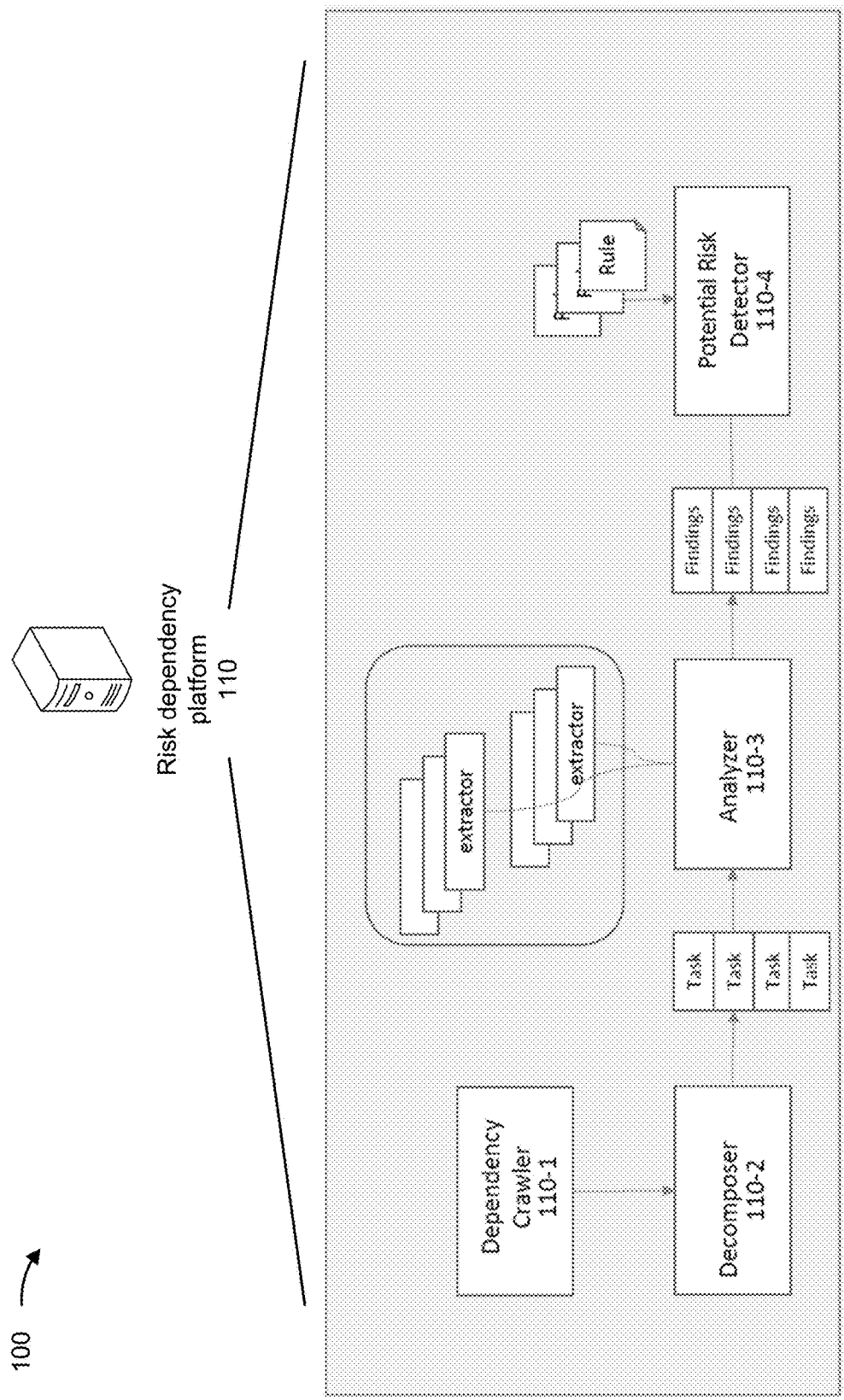

The following detailed description of example implementations refers to the accompanying drawings. The same reference numbers in different drawings may identify the same or similar elements.

Source code may be developed for task automation. The source code may be developed by a user using a computing device. The source code may be referred to as "parent source code." In some situations, the parent source code may include referenced source code by reference. The referenced source code may be previously developed for the task automation. In this case, when the parent source code is executed, the referenced source code is called and executed to automate one or more tasks. Accordingly, a dependency exists between the parent source code and the referenced source code.

Typically, the referenced source code is incorporated in the parent source code without the user verify the referenced source code (e.g., without verifying dependency associated with the referenced source and/or without verity a risk associated with the referenced source code). In some situations, the referenced source code may be unavailable. Additionally, or alternatively, the referenced source code may be improperly developed, maintained, and/or updated (or upgraded).

Moreover, executing the referenced source code may cause unexpected operations (or actions) on a host device that is managed or controlled using the parent source code. For example, executing the referenced source code may cause unexpected (or unintended) command executions on the host device, unexpected (or unintended) data transfer to and/or from the host device, and/or critical configuration of the host device. Accordingly, the task (to be automated by the referenced source code) may malfunction, thereby causing the parent source code to malfunction.

In some situations, the user may use the computing device to verify the parent source code. However, verifying the parent source code in this manner may be complex and time-consuming. For example, the parent source code may include a complex set of computer instructions. Additionally, or alternatively, a size of the parent source code and/or the referenced source code may be large.

As a result, verifying the parent source code in this manner may be subject to human errors. Additionally, the referenced source code is not verified because the referenced source code may be unavailable. Therefore, the parent source code is not properly verified. Accordingly, the task (to be automated by the referenced source code) may malfunction, thereby causing the parent source code to malfunction. In some instances, because of the complexity and/or the size of the parent source code, risks associated with the parent source code may not be apparent to the user.

Improperly verifying the parent source code may consume a significant amount of computing resources, network resources, and storage resources to troubleshoot the parent source code, troubleshoot the host device, repair the host device, and/or reconfigure the host device, among other examples. Therefore, a need exists for verifying the referenced source code before the referenced source code is incorporated in the parent source code and before the parent source code is executed to perform task automation.

Implementations described herein provide solutions to overcome the above issues relating to verifying a source code and/or a referenced source code incorporated by reference into the source code. For instance, implementations described herein are directed to discovering impactful (sometimes, potentially harmful) operations prior to signing and executing the source code. Signing the source code may refer to certifying or validating the source code. After the source code is signed, the source code may be executed to perform task automation. In some examples, the task automation may be used to manage a host device, such as a server.

In some examples, one or more dependencies may be identified for the source code. The one or more dependencies may identify the reference source code. The reference source code may be obtained and the source code and the referenced source code may be decomposed to obtain multiple portions of code (e.g., multiple portions of the source code). Each portion of code may be referred to as a task and may define an operation (or action) to be performed when the portion of code is executed. In this regard, each portion of code (or task) may include an executable. The executable may be referred to as a module.

In some examples, the multiple portions of code may be analyzed to determine operations that are performed based on the executables being executed. In some situations, the multiple portions of code may be analyzed to generate a graphical representation of the multiple portions of code. The graphical representation may be an object tree.

The operations may be evaluated, using one or more rules, to determine one or more risks associated with performing the operations. By determining the one or more risks, implementations described herein enable the source code to be verified before the source code is executed to perform task automation. In some examples, a report may be generated based on the one or more risks. For example, the report may include information regarding the one or more risks. Additionally, the report may identify recommendations for modifying the source code. Additionally, the source code may be modified to prevent the one or more risks from occurring when the source code is executed.

In some situations, the source code may be an Ansible® playbook that includes one or more collections, with each collection including one or more roles. A role may include one or more tasks, with each task including one or more modules. A module may include an executable (e.g., code that is executed to perform an operation, such as a task automation).

In this regard, implementations described herein analyze Ansible® artifacts (e.g., playbooks, roles, collections, among other examples). The Ansible® artifacts may be decomposed into a series of tasks. Rules may be applied to various types of tasks to obtain deep insight from the operations of the tasks. In some examples, the deep insight may identify risks associated with executing the modules of the tasks.

The rules may be rules for evaluating the modules of the tasks. The rules may be referred to as modular rules. Additionally, the rules may be extensible. In other words, the quantity of rules may increase as the quantity of modules increases.

Implementations described herein understand the taxonomy of Ansible® data structures and content types. Accordingly, the one or more dependencies are identified and evaluated to determine risks associated with executing modules of the one or more dependencies. Additionally, implementations described herein track complex variable lifecycle in static-analysis fashion across tasks. Additionally, implementations described herein constantly re-evaluate a vast dependency matrix based on predefined modular rules.

By determining the risks associated with the one or more dependencies of the source code, implementations described herein verify the referenced source code before the referenced source code is incorporated in the parent source code and before the parent source code is executed to perform task automation. Accordingly, implementations described herein preserve computing resources, network resources, and storage resources that would have been used to troubleshoot the source code, troubleshoot host device, repair the host device, and/or reconfigure the host device, among other examples.

FIGS. 1A-1I are diagrams of an example implementation 100 described herein. As shown in FIGS. 1A-1I, example implementation 100 includes a user device 105, a risk dependency platform 110, a source code repository 115, a first referenced code repository 120-1, a second referenced code repository 120-2, and a third referenced code repository 120-3. These devices are described in more detail below in connection with FIG. 3.

First referenced code repository 120-1, second referenced code repository 120-2, and third referenced code repository 120-3 may collectively be referred to as "referenced code repositories 120." User device 105, risk dependency platform 110, source code repository, first referenced code repository 120-1, second referenced code repository 120-2, and third referenced code repository 120-3 may be connected via wired connections, wireless connections, or a combination of wired and wireless connections.

The devices may be connected via a network that includes one or more wired and/or wireless networks. For example, the network may include Ethernet switches. Additionally, or alternatively, the network may include a cellular network, a public land mobile network (PLMN), a local area network (LAN), a wide area network (WAN), a private network, the Internet, and/or a combination of these or other types of networks. The network enables communication between user device 105, risk dependency platform 110, source code repository, referenced code repository 120-1, second referenced code repository 120-2, and third referenced code repository 120-3, and/or one or more additional devices associated with risk dependency platform 110.

User device 105 may include one or more devices configured to receive, generate, store, process, and/or provide information associated with dependency risk evaluation of a source code for task automation, as explained herein. User device 105 may be used to develop the source code. In some examples, the source code may be an Ansible® playbook. User device 105 may include a communication device and a computing device. For example, user device 105 may include a wireless communication device, a mobile phone, a user equipment, a laptop computer, a tablet computer, a desktop computer, or a similar type of device.

Risk dependency platform 110 may include one or more devices configured to receive, generate, store, process, and/or provide information associated with dependency risk evaluation of a source code, as explained herein. In some examples, risk dependency platform 110 may be configured to analyze the source code to determine one or more dependencies associated with the source code, as described herein.

Source code repository 115 may include one or more devices configured to receive, generate, store, process, and/or provide information associated with dependency risk evaluation of a source code, as explained herein. In some examples, source code repository 115 may be a repository that stores source code developed using and received from multiple devices. For example, source code repository 115 may be a repository that stores the source code developed by user device 105.

First referenced code repository 120-1 may include one or more devices configured to receive, generate, store, process, and/or provide information associated with dependency risk evaluation of a source code, as explained herein. In some examples, source code repository 115 may be a repository that stores referenced source code that is certified. The reference source code may be a dependency of the source code (e.g., an external dependency). The referenced source code may be associated with a first level of trust. As an example, first referenced code repository 120-1 may be Ansible® Galaxy and may be a repository that stores Ansible® roles and collections.

Second referenced code repository 120-2 may include one or more devices configured to receive, generate, store, process, and/or provide information associated with dependency risk evaluation of a source code, as explained herein. In some examples, source code repository 115 may be a repository that stores referenced source code that is associated with a second level of trust. The first level of trust may exceed the second level of trust. The reference source code may be a dependency of the source code (e.g., an external dependency). In some examples, source code repository 115 may be an Ansible® automation hub. The Ansible® automation hub may be a repository that stores collections and roles.

Third referenced code repository 120-3 may include one or more devices configured to receive, generate, store, process, and/or provide information associated with dependency risk evaluation of a source code, as explained herein. In some examples, third referenced code repository 120-3 may be a repository that stores referenced source code that is associated with a third level of trust. The first level of trust may exceed the second level of trust and the third level of trust. The reference source code may be a dependency of the source code (e.g., an external dependency). Third referenced code repository 120-3 may be a third-party repository of referenced source code developed by third-parties. In some examples, source code repository 115 may be an Ansible® private automation hub.

As shown in FIG. 1B, risk dependency platform 110 may include a dependency crawler 110-1, a decomposer 110-2, an analyzer 110-3, and a potential risk detector 110-4. Dependency crawler 110-1 may include one or more devices configured to analyze source code to identify dependencies of the source code. Dependency crawler 110-1 may be crawler (e.g., code) that is used to crawl source code repository 115 and/or referenced code repositories 120 to obtain data that may be used to determine the one or more dependencies. In some situations, dependency crawler 110-1 may obtain the source code from source code repository 115 and may obtain the dependencies from one or more referenced code repository 120.

Decomposer 110-2 may include one or more devices configured to decompose the source and the reference source code identified by the dependencies. For example, the source code and the reference source code may be decomposed into a plurality of tasks and a plurality of modules associated with the plurality of tasks.

Analyzer 110-3 may include one or more devices configured to analyze the source code and the reference source code to determine operations that are performed based on the plurality of modules being executed. Analyzer 110-3 may determine the operations using a plurality of extractors. Analyzer 110-3 may generate findings regarding the operations (e.g., information regarding the findings). For example, analyzer 110-3 may use a first extractor to determine a first operation performed based on a first module (of a first task) being executed, use a second extractor to determine a second operation performed based on a second module (of a second task) being executed, and so on. For instance, analyzer 110-3 may use the first extractor to generate a first finding regarding the first operation, may use the second extractor to generate a second finding regarding the second operation, and so on.

Each extractor may be generated for a respective module. An extractor may include a script configured to determine a task type for a respective module. The task type may identify an operation performed as a result of executing the respective module. The extractor may generate information regarding the task type as a finding.

In some implementations, the plurality of extractors may be generated using a training data set that includes information regarding different tasks. In this regard, additional extractors may be generated as additional tasks and modules are developed.

Potential risk detector 110-4 may evaluate the operations, using one or more rules, to determine risks associated with performing the operations. In some examples, potential risk detector 110-4 may evaluate a first operation using a first rule, evaluate a second operation using a second rule, evaluate a combination of a third operation and a fourth operation using a third rule, and so on.

In some implementations, the one or more rules may be generated using a training data set that includes information regarding different tasks (e.g., information regarding historical tasks). In this regard, additional rules may be generated as additional tasks and modules are developed. In some implementations, potential risk detector 110-4 may generate a report including information regarding the one or more rules.

Figure 1C:
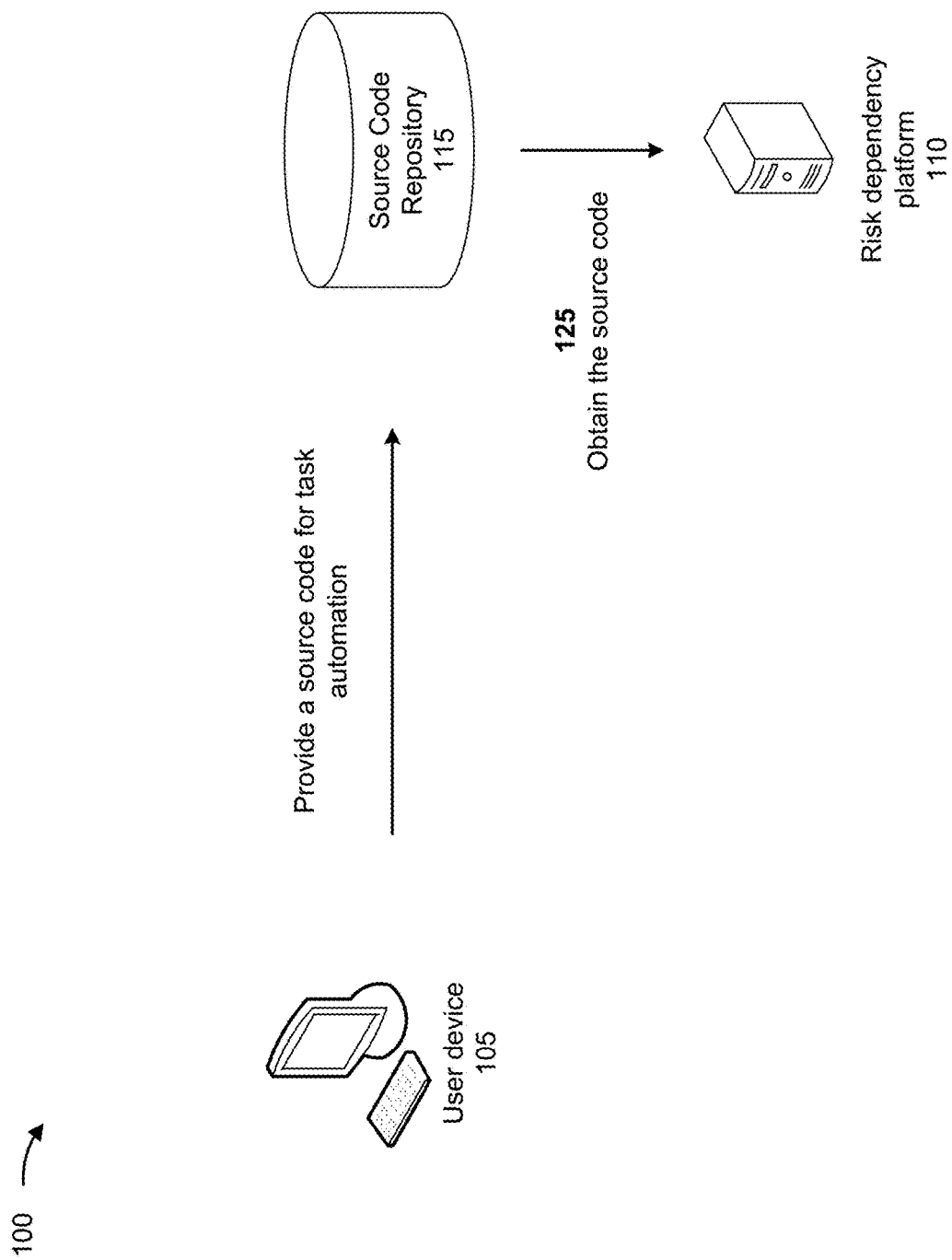

As shown in FIG. 1C, user device 105 may provide a source code to source code repository 115. For example, User device 105 may develop the source code for task automation. The task automation may be used for managing an operation of a device, such as a server. In some examples, the source code may be an Ansible® playbook.

As shown in FIG. 1C, and by reference number 125, risk dependency platform 110 may obtain the source code. For example, risk dependency platform 110 may obtain the source code from source code repository 115. In some implementations, risk dependency platform 110 may obtain the source code based on a trigger. As an example, the trigger may be a request to verify the source code prior to the source code being signed using user device 105. For instance, risk dependency platform 110 may receive the request from user device 105 and may include information identifying the source code (e.g., information that may be used to perform a lookup of source code repository 115). Additionally, or alternatively, the trigger may be an indication that the source code has been received by source code repository 115.

In some implementations, risk dependency platform 110 may obtain the source code periodically (e.g., every hour, every four hours, every day, among other examples). For example, risk dependency platform 110 may search source code repository 115 periodically to identify new source code that has been received by source code repository 115. In some implementations, risk dependency platform 110 may obtain directories or files, such as a collection directory, a role directory, a project repository, among other examples.

Figure 1D:
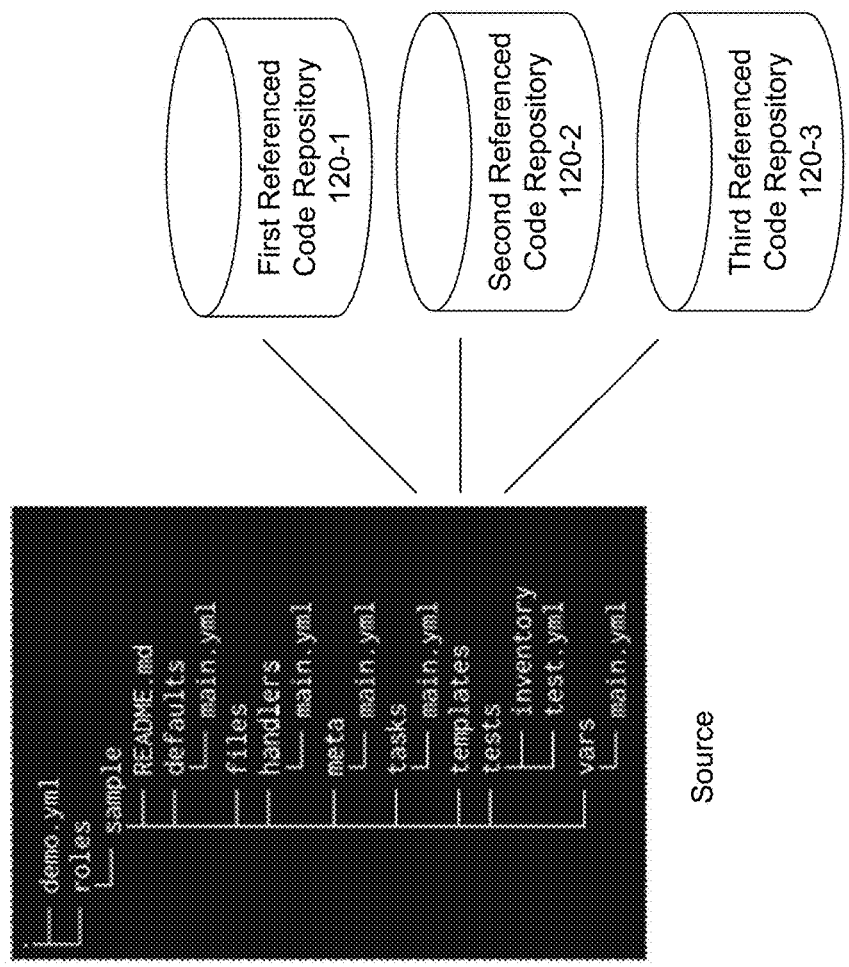
Figure 1D:
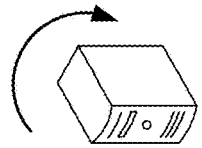

As shown in FIG. 1D, and by reference number 130, risk dependency platform 110 may analyze the source code to determine one or more dependencies. For example, risk dependency platform 110 may analyze the source code using dependency crawler 110-1. In some situations, based on analyzing the source code, risk dependency platform 110 may determine that the source code includes referenced source code by reference.

As shown in FIG. 1D, for example, the source code may include (by reference) referenced source code from one or more of referenced code repositories 120. The referenced source code from each reference code repository 120 may be referred to as a dependency.

Figure 1E:
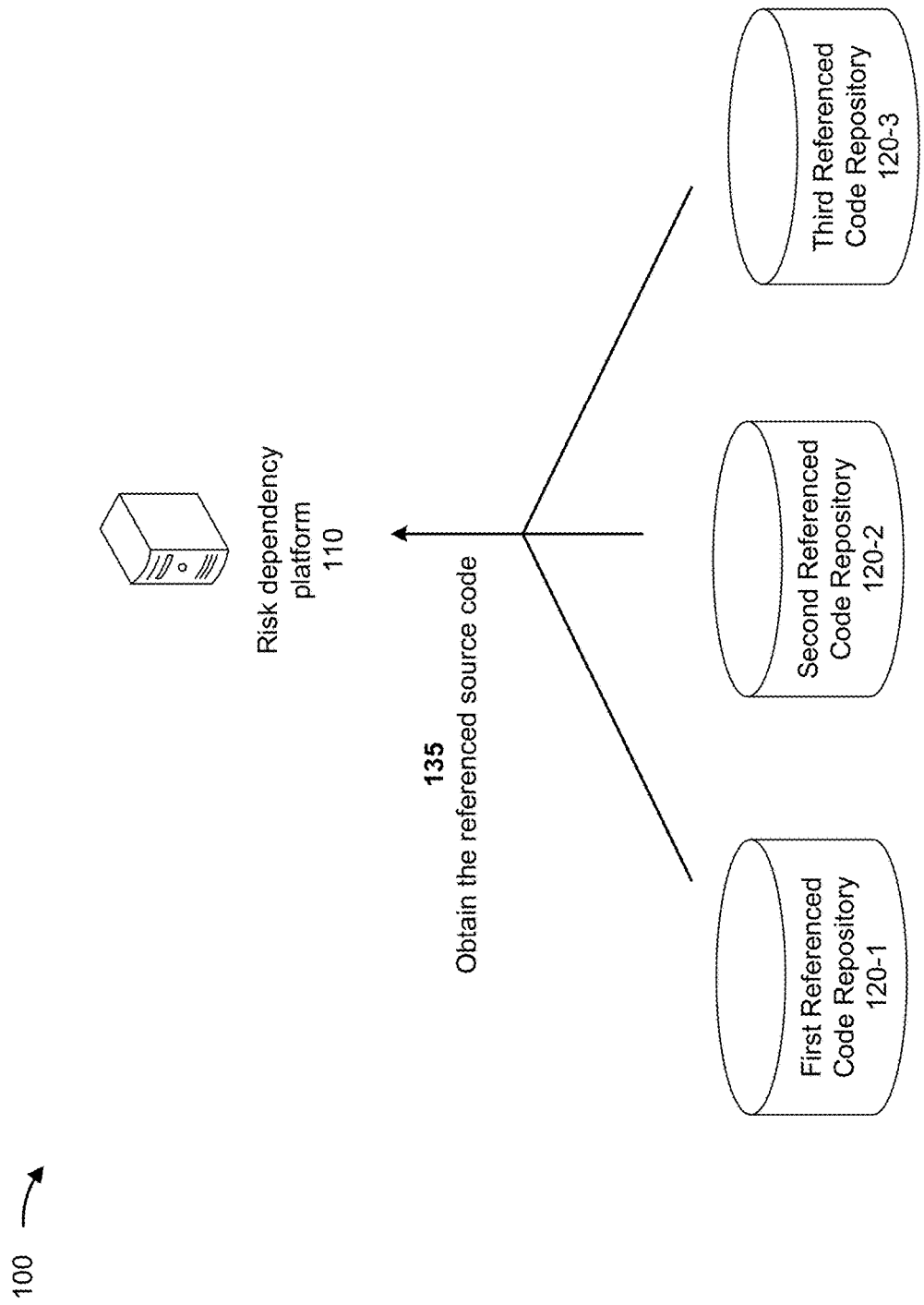

As shown in FIG. 1E, and by reference number 135, risk dependency platform 110 may obtain the referenced source code. For example, based on identifying the one or more dependencies, risk dependency platform 110 may obtain the referenced source code from referenced code repositories 120. For instance, risk dependency platform 110 may use dependency crawler 110-1 to crawl source code repository 115 and referenced code repositories to obtain the referenced source code. For example, dependency crawler 110-1 may analyze the source code to determine that the source code includes information identifying the referenced source code. In some situations, dependency crawler 110-1 may the information identifying the referenced source code to perform a lookup of referenced code repositories 120.

In some instances, risk dependency platform 110 may obtain (and install) an Ansible® galaxy (which includes roles and/or collections). Additionally, risk dependency platform 110 may obtain requirements for executing the source code (e.g., requirements.yml) or tarballs. In some situations, the source code and the reference source code may be stored in a repository.

Figure 1F:
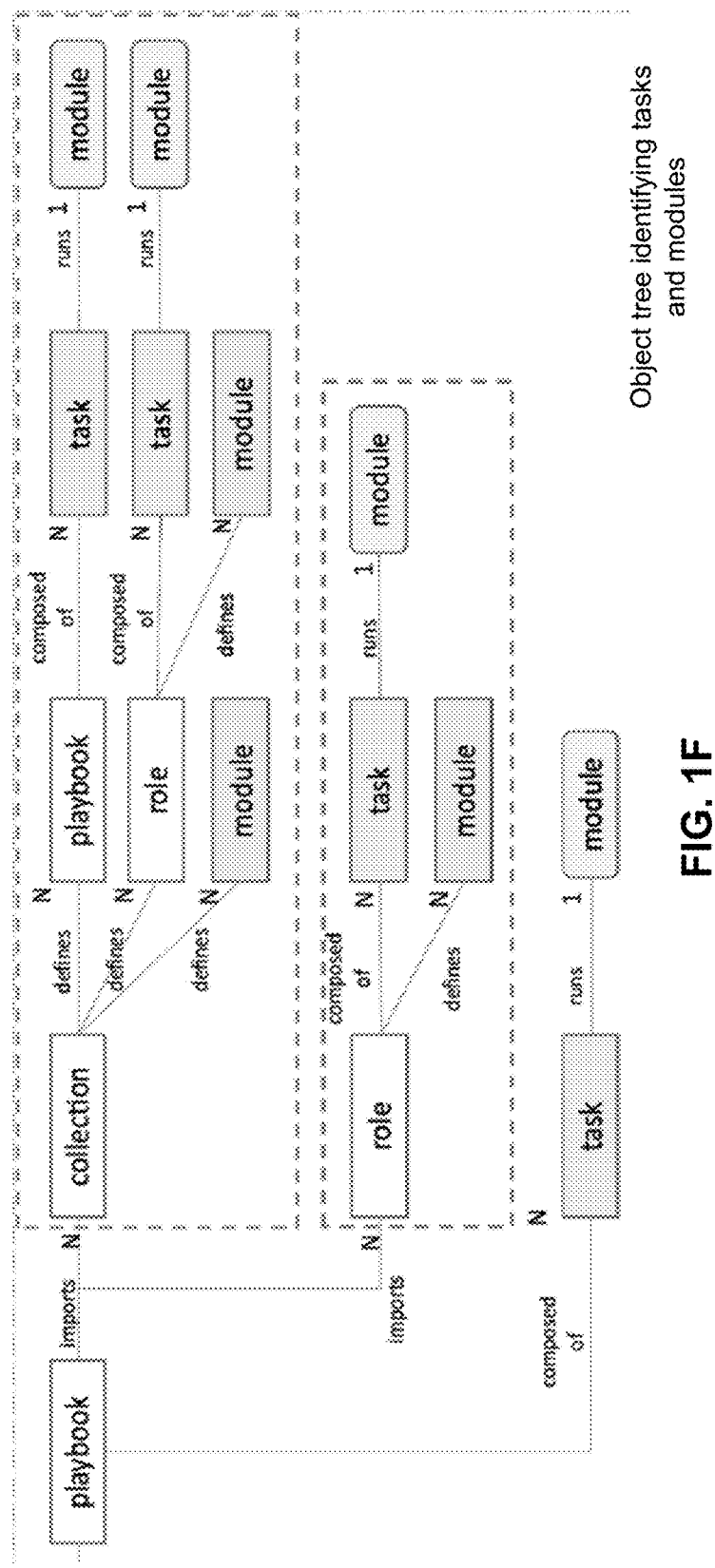

As shown in FIG. 1F, and by reference number 140, risk dependency platform 110 may decompose the source code and the referenced source code into a graphical representation that identifies a plurality of tasks. For example, risk dependency platform 110 may use decomposer 110-2 to decompose the source code and the referenced source code (e.g., stored in the repository). In some implementations, the graphical representation may be an object tree.

As shown in FIG. 1F, the source code may be an Ansible® playbook. For example, the source code may include one or more collections and each collection may include a role, a task, and a module. The Ansible® playbook may be decomposed in a series of tasks, with each task including an executable. The executable may be referred to as a module.

In some examples, the objects (or the object tree) may include playbooks, play, roles, collections, taskfiles, modules. As shown in FIG. 1F, the graphical representation may identify a task and module pair. In other words, the graphical representation may identify a module of a task.

Figure 1G:
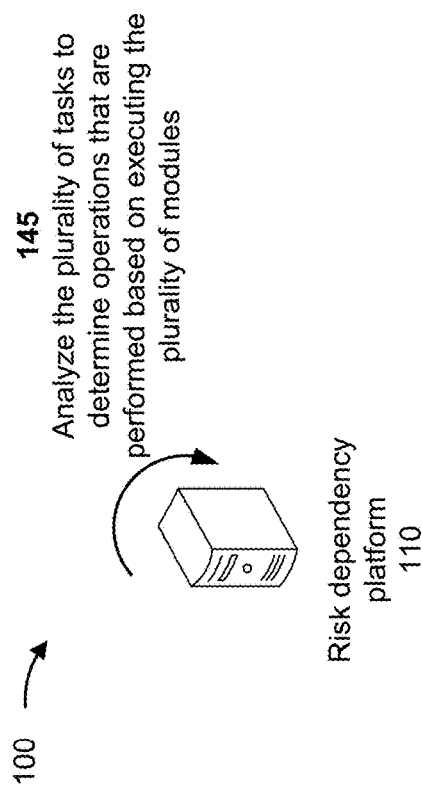

As shown in FIG. 1G, and by reference number 145, risk dependency platform 110 may analyze the plurality of tasks to determine operations that are performed based on executing the plurality of modules. In some implementations, risk dependency platform 110 may use analyzer 110-3 to analyze the graphical representation. In some situations, based on analyzing the graphical representation, analyzer 110-3 may determine whether the referenced source code has been certified, whether the referenced source code has been verified and signed, among other examples. The referenced source code may be certified, verified, and/or signed to confirm a validity and/or a trustworthiness of the referenced source code.

Additionally, or alternatively, analyzer 110-3 may perform deep analytics of module options. For example, analyzer 110-3 may use extractors to determine a task type of each module. The task type may indicate an operation performed when a module, of a task, is executed.

As shown in FIG. 1G, the source code may include a first task entitled "download" and a second task entitled "run." The first task may include a first module "get_url" which causes information to be downloaded. The first task type may be "download." The second task may include a second module "command" which causes a command to be executed. The second task type may be "execution."

As shown in FIG. 1G, analyzer 110-3 may include a first extractor for the first module and a second extractor for the second module. The first extractor may identify the first task type along with parameters utilized by the first module. The second extractor may identify the second task type along with parameters utilized by the second module.

The extractors may be used to identify operations performed when the modules are executed. For examples, the operations may include an outbound data transfer (e.g., a data upload, a data leak), an inbound data transfer (e.g., a download), a configuration change (e.g., a change to a configuration of the host device), an anomaly operation, a privilege escalation, a drift detection, a role injection, among other examples.

The change to the configuration may include a change to a security configuration. The change to the security configuration may reduce a measure of security of the host device. Accordingly, the change to the security configuration may subject the host device to a security attack. The anomaly operation may refer to a difference between an intent of a task and an actual operation of the task. The actual operation of the task may be an unintended operation that may cause the host device to malfunction and/or that may subject the host device to a security attack. The privilege escalation may refer to modifying privileges of the host device to grant root access to the source code. The drift detection may refer to unknown changes from a first version of software to a second version of software.

In some examples, analyzer 110-3 may perform a context analysis. For example, analyzer 110-3 may analyze a call tree, analyze task chains (e.g., a combination of tasks), analyze a variable resolution (e.g., a risk associated with dynamic variables as opposed to static variables). Analyze 110-3 may generate findings that provide information regarding the operations.

Figure 1H:
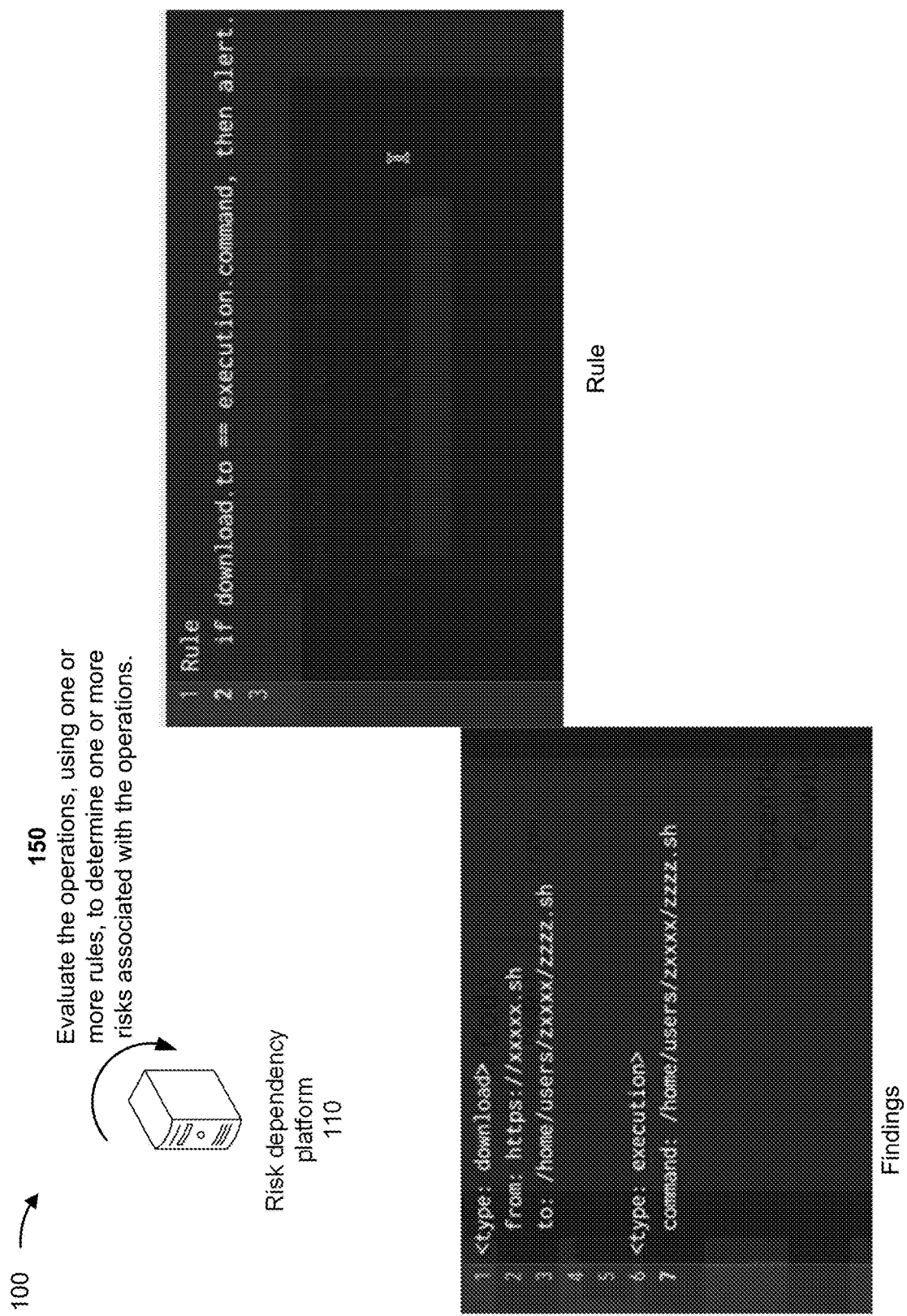

As shown in FIG. 1H, and by reference number 150, risk dependency platform 110 may evaluate the operations, using one or more rules, to determine one or more risks associated with the operations. For example, potential risk detector 110-4 may evaluate the operations using the one or more rules, as explained herein. For example, potential risk detector 110-4 may evaluate the findings using the one or more rules, as explained herein.

As shown in FIG. 1H, a first finding may include information regarding the first task and the first module and include information regarding the second task and the second module. As shown in FIG. 1H, potential risk detector 110-4 may evaluate a combination of tasks using a rule. For example, the rule may address a combination of a download and a command execution. For instance, the rule may indicate that an alert is to be generated if data (e.g., a file) is downloaded from an external device to the host device and the data is executed. In other words, the combination of the download and the command execution may pose a risk to the host device. Potential risk detector 110-4 may evaluate individual tasks and/or a combination of tasks using one or more rules in a similar manner.

Figure 1I:
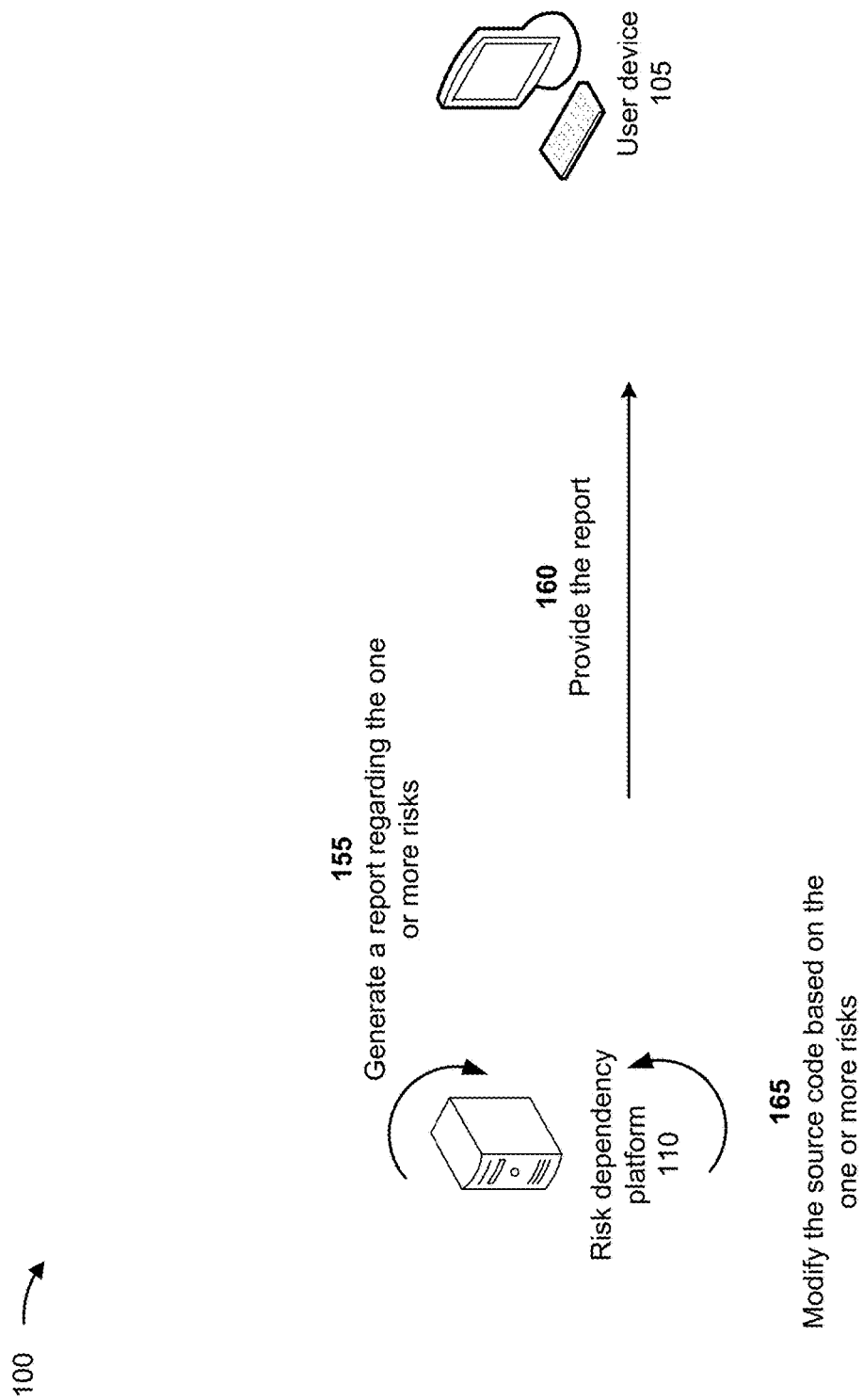

As shown in FIG. 1I, and by reference number 155, risk dependency platform 110 may generate a report regarding the one or more risks. For example, the report may include information regarding the one or more risks. In some implementations, the information (regarding the one or more risks) may include information identifying one or more task types associated with the one or more risks, information identifying one or more tasks associated with the operations, information identifying one or more modules associated with the operations, and/or information indicating changes to be made to the source code to reduce and/or remove the one or more risks, among other examples.

As shown in FIG. 1I, and by reference number 160, risk dependency platform 110 may provide the report. For example, risk dependency platform 110 may provide the report to user device 105.

As shown in FIG. 1I, and by reference number 165, risk dependency platform 110 may modify the source code based on the one or more risks. In some implementations, risk dependency platform 110 may implement the changes to the source code, as identified in the report. Risk dependency platform 110 may provide the modified source code to user device 105.

By determining the risks associated with the one or more dependencies of the source code, implementations described herein verify the referenced source code before the referenced source code is incorporated in the parent source code and before the parent source code is executed to perform task automation. Accordingly, implementations described herein preserve computing resources, network resources, and storage resources that would have been used to troubleshoot the source code, troubleshoot host device, repair the host device, and/or reconfigure the host device, among other examples.

Implementations described herein enable the source code to be broken down into a series of task executions, and enable rule-based risk events to be detected by using context analysis with modular rules and/or the extractors framework described herein.

One advantage of implementations described herein is identifying risks associated with dependencies of the source code before the source code is executed. For example, the risks may include risk from software supply chain, risk from potential harmful operation, among other examples. Accordingly, another advantage of implementations described herein is to verify the referenced source code before the referenced source code is incorporated in the parent source code and before the parent source code is executed to perform task automation. Accordingly, another advantage of implementations described herein is to preserve computing resources, network resources, and storage resources that would have been used to troubleshoot the source code, troubleshoot host device, repair the host device, and/or reconfigure the host device, among other examples.

As indicated above, FIGS. 1A-1I are provided as an example. Other examples may differ from what is described with regard to FIGS. 1A-1I. The number and arrangement of devices shown in FIGS. 1A-1I are provided as an example. A network, formed by the devices shown in FIGS. 1A-1I may be part of a network that comprises various configurations and uses various protocols including local Ethernet networks, private networks using communication protocols proprietary to one or more companies, cellular and wireless networks (e.g., Wi-Fi), instant messaging, Hypertext Transfer Protocol (HTTP) and simple mail transfer protocol (SMTP), and various combinations of the foregoing.

There may be additional devices (e.g., a large number of devices), fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
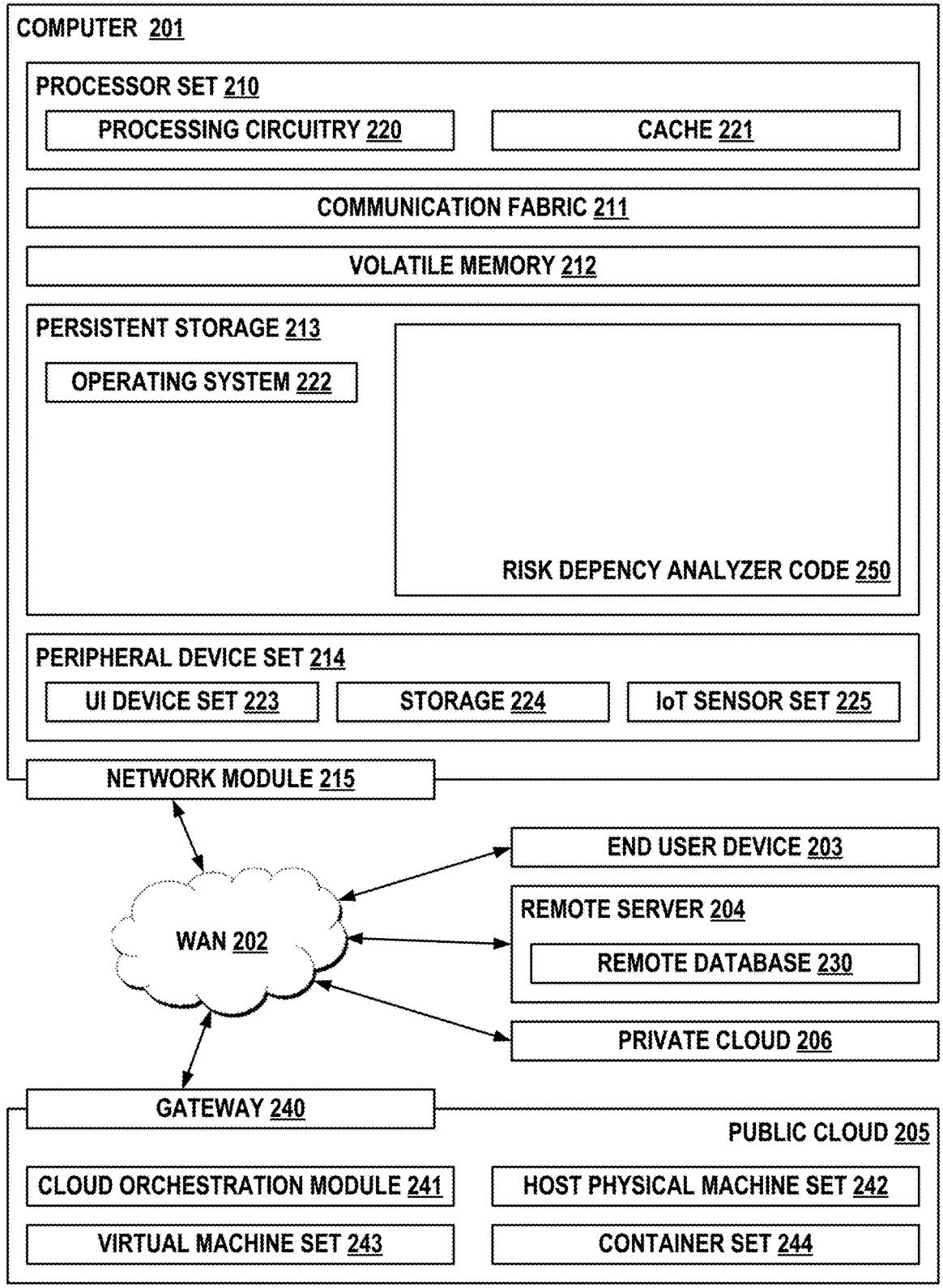
FIG. 2 is a diagram of an example computing environment in which systems and/or methods described herein may be implemented.

FIG. 2 is a diagram of an example computing environment 200 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 contains an example of an environment for the execution of at least some of the computer code involved in performing the inventive methods, such as risk dependency analyzer code 250. In addition to block 250, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and block 250, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

COMPUTER 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

PROCESSOR SET 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in block 250 in persistent storage 213.

COMMUNICATION FABRIC 211 is the signal conduction path that allows the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

PERSISTENT STORAGE 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in block 250 typically includes at least some of the computer code involved in performing the inventive methods.

PERIPHERAL DEVICE SET 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

NETWORK MODULE 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 203 is any computer system that is used and controlled by an end user (for example, a customer of an enterprise that operates computer 201) and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

REMOTE SERVER 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

PUBLIC CLOUD 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
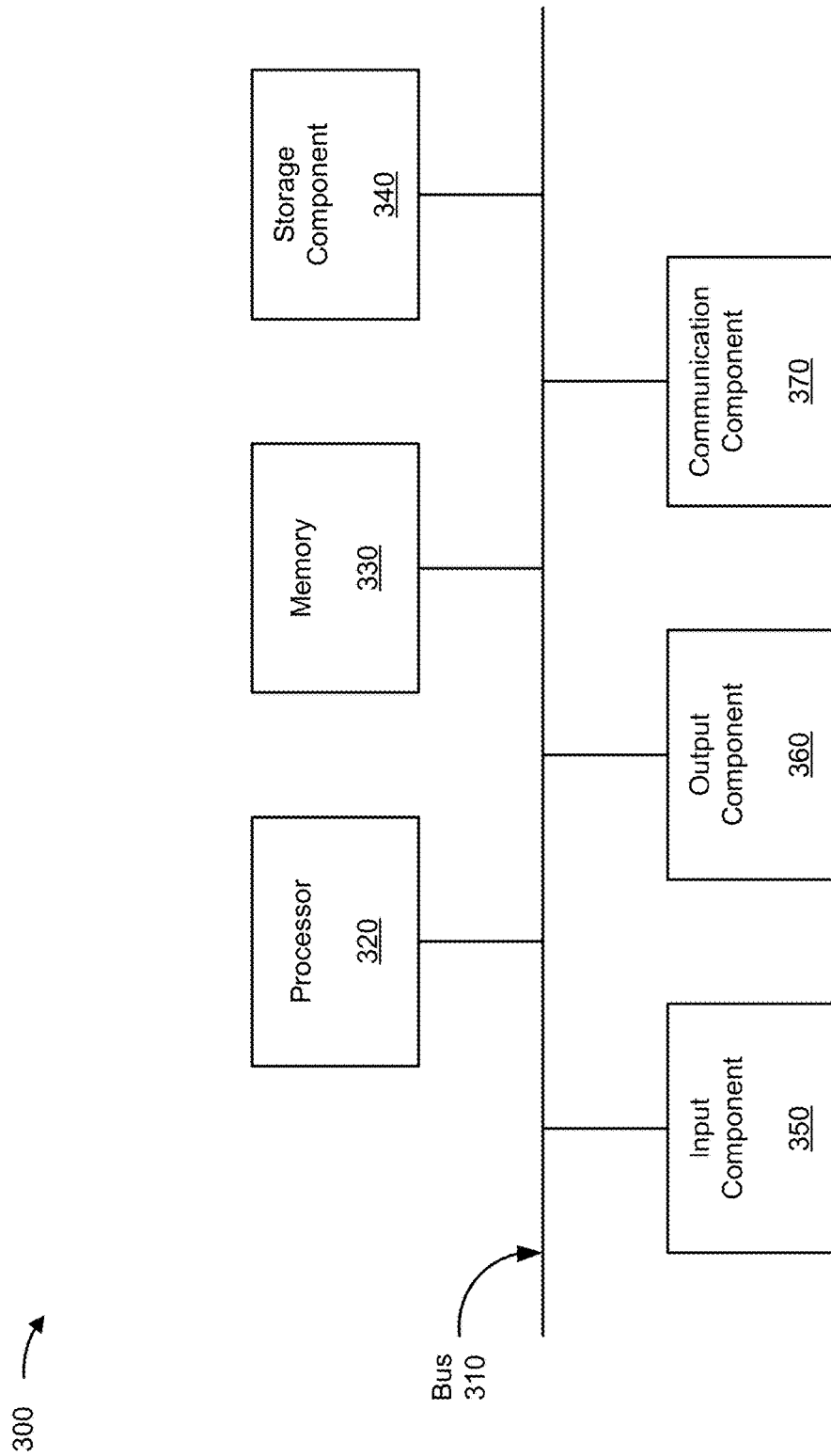
FIG. 3 is a diagram of example components of one or more devices of FIGS. 1 and 2.

FIG. 3 is a diagram of example components of a device 300, which may correspond to user device 105 and/or risk dependency platform 110. In some implementations, user device 105 and/or risk dependency platform 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may be a repository that stores a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
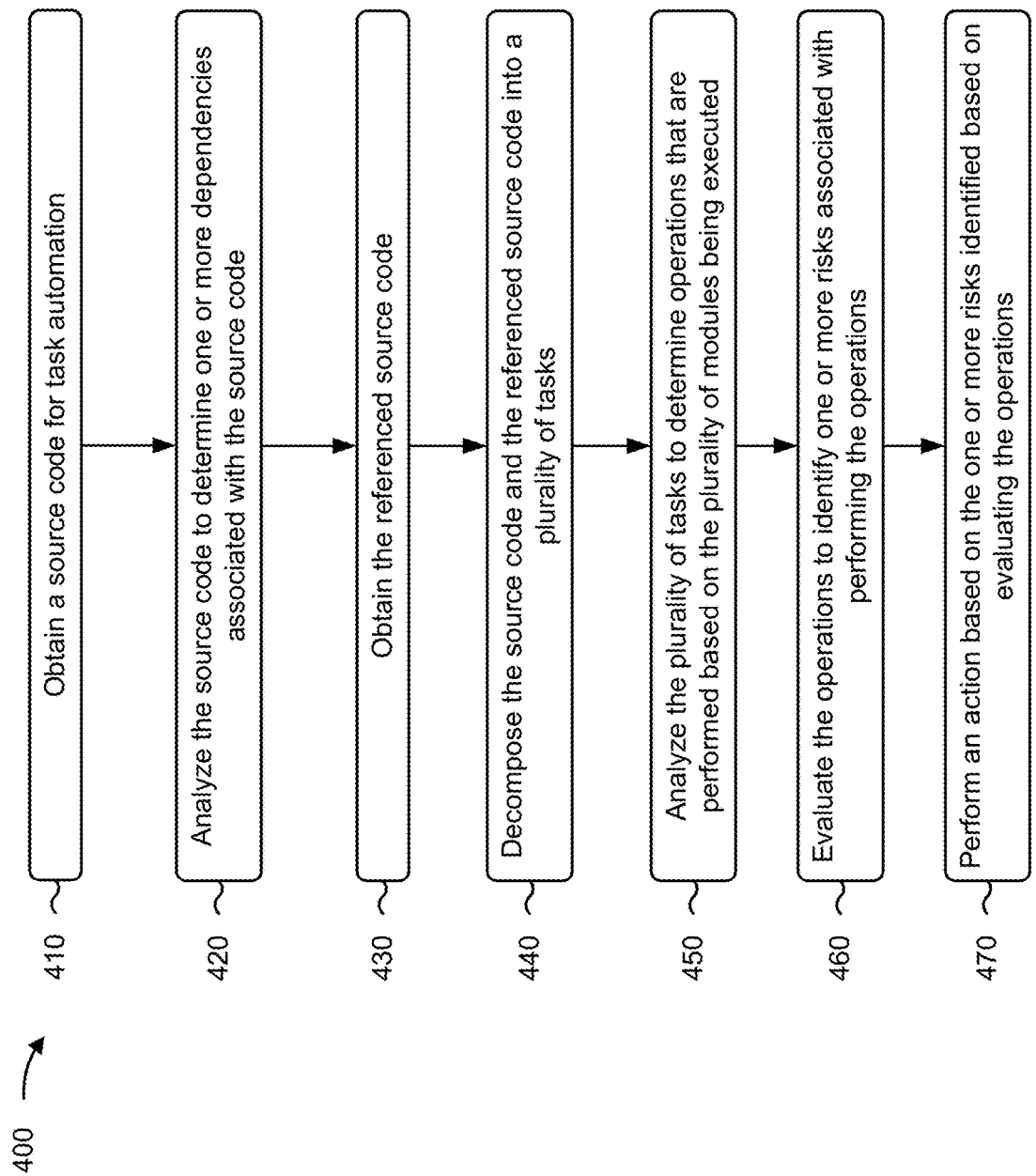
FIG. 4 is a flowchart of an example process associated with a domain transformation to an immersive virtual environment using artificial intelligence.

FIG. 4 is a flowchart of an example process 400 associated with risk dependency evaluation of a source code for automated tasks. In some implementations, one or more process blocks of FIG. 4 may be performed by a risk dependency platform (e.g., risk dependency platform 110). In some implementations, one or more process blocks of FIG. 4 may be performed by another device or a group of devices separate from or including the domain transformation system, such as a user device (e.g., user device 105). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining a source code for task automation (block 410). For example, the risk evaluation platform may obtain a source code for task automation, as described above.

As further shown in FIG. 4, process 400 may include analyzing the source code to determine one or more dependencies associated with the source code (block 420). For example, the risk evaluation platform may analyze the source code to determine one or more dependencies associated with the source code, wherein the one or more dependencies identify referenced source code that are included in the source code by reference, as described above. In some implementations, the one or more dependencies identify referenced source code that are included in the source code by reference.

As further shown in FIG. 4, process 400 may include obtaining the referenced source code (block 430). For example, the risk evaluation platform may obtain the referenced source code, as described above.

As further shown in FIG. 4, process 400 may include decomposing the source code and the referenced source code into a plurality of tasks (block 440). For example, the risk evaluation platform may decompose the source code and the referenced source code into a plurality of tasks, wherein the plurality of tasks invoke a plurality of modules that are executables, as described above. In some implementations, the plurality of tasks invoke a plurality of modules that are executables.

As further shown in FIG. 4, process 400 may include analyzing the plurality of tasks to determine operations that are performed based on the plurality of modules being executed (block 450). For example, the risk evaluation platform may analyze the plurality of tasks to determine operations that are performed based on the plurality of modules being executed, as described above.

As further shown in FIG. 4, process 400 may include evaluating the operations to identify one or more risks associated with performing the operations (block 460). For example, the risk evaluation platform may evaluate the operations to identify one or more risks associated with performing the operations, as described above.

As further shown in FIG. 4, process 400 may include performing an action based on the one or more risks identified based on evaluating the operations (block 470). For example, the risk evaluation platform may perform an action based on the one or more risks identified based on evaluating the operations, as described above.

In some implementations, performing the action comprises modifying one or more portions of the source code to generate modified source code, wherein the one or more portions of the source code are modified based on the risks associated with performing the operations.

In some implementations, performing the action comprises generating a report that includes information identifying the operations, and information identifying recommendations regarding the operations.

In some implementations, analyzing the plurality of tasks comprises determining a first task type of a first module of a first task, determining a second task type of a second module of a second task, determining, based on the first task type, a first action performed when executing the first module, and determining, based on the second task type, a second action performed when executing the second module.

In some implementations, evaluating the operations comprises evaluating, using a rule, the first action in combination with the second action, and determining a risk associated with executing the first module in combination with executing the second module based on evaluating the first action in combination with the second action using the rule.

In some implementations, determining the first action comprises determining that the first action is downloading data, and wherein determining the first action comprises determining that the second action is executing the data.

In some implementations, decomposing the source code and the referenced source code comprises generating an object tree representing the source code and the one or more dependencies, and analyzing the object tree to identify a first dependency that is certified and a second dependency that is signed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method comprising:
   obtaining a source code for task automation;
   analyzing the source code to determine one or more dependencies associated with the source code,
      wherein the one or more dependencies identify referenced source code that are included in the source code by reference;
   obtaining the referenced source code;
   decomposing the source code and the referenced source code into a plurality of tasks,
      wherein the plurality of tasks invoke a plurality of modules that are executables;
   analyzing the plurality of tasks to determine operations that are performed based on the plurality of modules being executed;
   evaluating the operations to identify one or more risks associated with performing the operations; and
   performing an action based on the one or more risks identified based on evaluating the operations.

2. The computer-implemented method of claim 1, wherein performing the action comprises:
   modifying one or more portions of the source code to generate modified source code,
      wherein the one or more portions of the source code are modified based on the one or more risks associated with performing the operations.

3. The computer-implemented method of claim 1, wherein performing the action comprises:
   generating a report that includes:
      information identifying the operations, and
      information identifying recommendations regarding the operations.

4. The computer-implemented method of claim 1, wherein analyzing the plurality of tasks comprises:
   determining a first task type of a first module of a first task;
   determining a second task type of a second module of a second task;
   determining, based on the first task type, a first action performed when executing the first module; and determining, based on the second task type, a second action performed when executing the second module.

5. The computer-implemented method of claim 4, wherein evaluating the operations comprises:
evaluating, using a rule, the first action in combination with the second action; and
determining a risk associated with executing the first module in combination with executing the second module based on evaluating the first action in combination with the second action using the rule.

6. The computer-implemented method of claim 4, wherein determining the first action comprises:
determining that the first action is downloading data; and wherein determining the first action comprises:
determining that the second action is executing the data.

7. The computer-implemented method of claim 1, wherein decomposing the source code and the referenced source code comprises:
generating an object tree representing the source code and the one or more dependencies; and
analyzing the object tree to identify a first dependency that is certified and a second dependency that is signed.

8. A computer program product comprising:
one or more non-transitory computer readable storage media, and program instructions collectively stored on the one or more non-transitory computer readable storage media, the program instructions comprising:
program instructions to analyze a source code to determine one or more dependencies associated with the source code,
wherein the one or more dependencies identify referenced source code that is included in the source code by reference;
program instructions to obtain the referenced source code;
program instructions to decompose the source code and the referenced source code into a graphical representation that identifies a plurality of tasks,
wherein the plurality of tasks are portions of the source code and of the referenced source code, and
wherein the plurality of tasks invoke a plurality of modules that are executables;
program instructions to analyze the plurality of tasks to determine task types for the plurality of modules,
wherein the task types identify operations that are performed based on the plurality of modules being executed;
program instructions to evaluate the operations, using one or more rules, to identify one or more risks associated with performing the operations; and
program instructions to cause the source code to be executed based on the one or more risks.

9. The computer program product of claim 8, wherein the program instructions to analyze the plurality of tasks to determine the task types comprise:
program instructions to analyze the plurality of modules, using a plurality of extractors, to determine the task types,
wherein an extractor, of the plurality of extractors, is configured to determine a task type for a respective module of the plurality of modules.

10. The computer program product of claim 9, wherein the program instructions further comprise:
program instructions to generate the extractor using a data set that includes information regarding historical tasks.

11. The computer program product of claim 8, wherein the program instructions to analyze the plurality of tasks to determine types of the plurality of tasks comprise:
program instructions to determine a first task type indicating an inbound data transfer; and
program instructions to determine a second task type indicating an outbound data transfer.

12. The computer program product of claim 11, wherein the program instructions to analyze the plurality of tasks to determine types of the plurality of tasks comprise:
program instructions to determine a third task type indicating a privilege escalation; and
program instructions to determine a fourth task type indicating an anomaly operation.

13. The computer program product of claim 11, wherein the program instructions to analyze the plurality of tasks to determine types of the plurality of tasks comprise:
program instructions to determine a type of a task of a first task of the plurality of tasks; and
program instructions to determine an action performed when executing a module of the task based on the type of the task.

14. The computer program product of claim 9, wherein the program instructions further comprise:
program instructions to generate the one or more rules using a data set that includes information regarding historical tasks.

15. A system comprising:
one or more devices, comprising a processor, configured to:
analyze a source code to determine one or more dependencies associated with the source code,
wherein the one or more dependencies identify referenced source code that is included in the source code by reference;
obtain the referenced source code;
decompose the source code and the referenced source code into a graphical representation that identifies a plurality of tasks,
wherein the plurality of tasks are portions of the source code and of the referenced source code, and
wherein the plurality of tasks invoke a plurality of modules that are executables;
analyze the plurality of tasks to determine task types for the plurality of modules, wherein the task types identify operations that are performed based on the plurality of modules being executed;
evaluate the operations to identify one or more risks associated with performing the operations; and
cause the source code to be executed based on the one or more risks.

16. The system of claim 15, wherein the one or more devices are further configured to:
generate a report that includes information regarding the one or more risks.

17. The system of claim 15, wherein, to evaluate the operations, the one or more devices are configured to:
evaluate the operations, using one or more rules, to identify the one or more risks.

18. The system of claim 15, wherein, to analyze the plurality of tasks to determine the task types, the one or more devices are configured to:
determine a first task type indicating an inbound data transfer; and
determine a second task type indicating an outbound data transfer.

19. The system of claim 18, wherein, to analyze the plurality of tasks to determine task types, the one or more devices are configured to:
  determine a third task type indicating a privilege escalation; and
  determine a fourth task type indicating an anomaly operation.

20. The system of claim 15, wherein, to analyze the plurality of tasks to determine task types, the one or more devices are configured to:
  generate an object tree representing the source code and the one or more dependencies; and
  analyze the object tree to identify a first dependency that is certified and a second dependency that is signed.

\* \* \* \* \*